M. H. WINSLOW.
PLATFORM SCALE.
APPLICATION FILED JAN. 28, 1915.
1,171,998.
Patented Feb. 15, 1916.
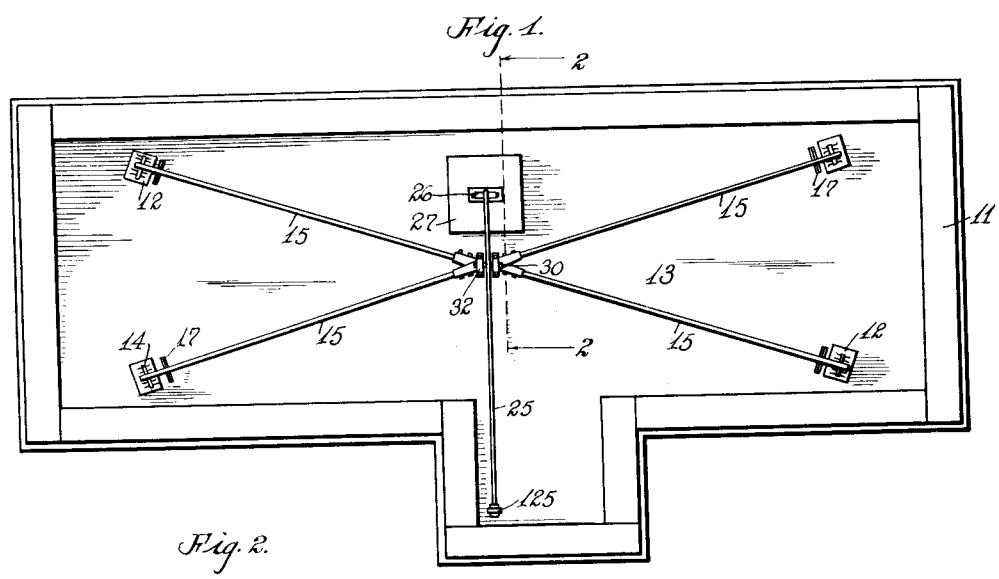
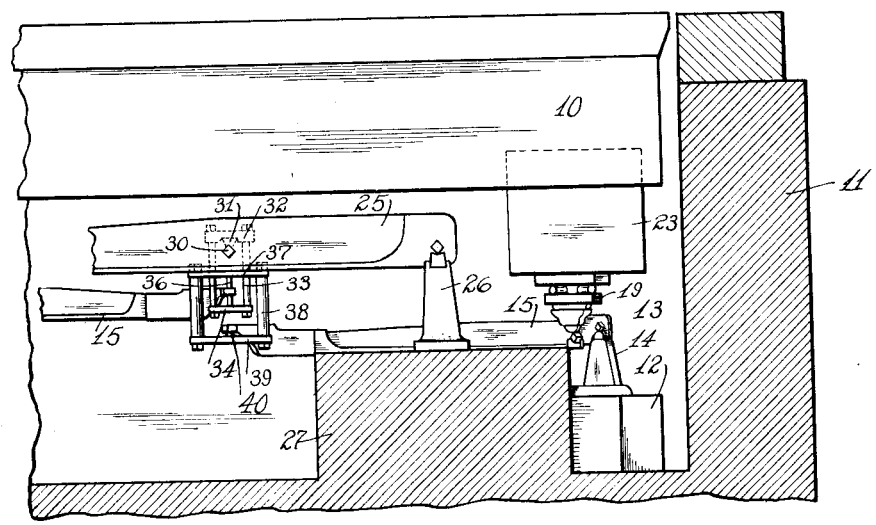
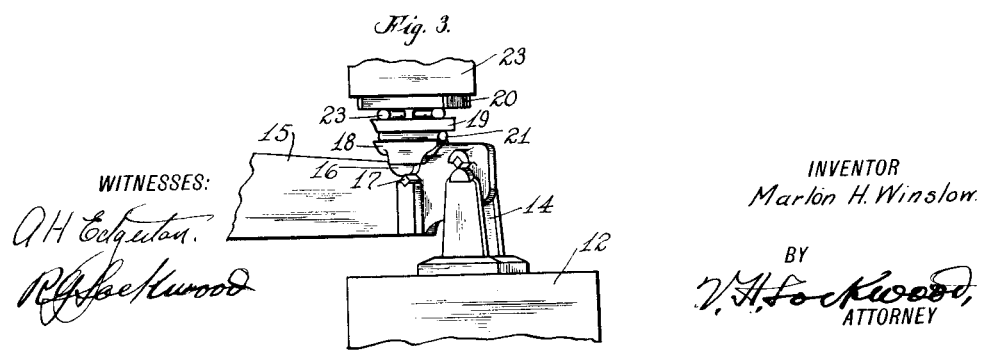
WITNESSES:
INVENTOR
Marlon H. Winslow.
BY
ATTORNEY

UNITED STATES PATENT OFFICE.

MARLON H. WINSLOW, OF TERRE HAUTE, INDIANA.

PLATFORM-SCALE.

1,171,998. Specification of Letters Patent. Patented Feb. 15, 1916.

Application filed January 28, 1915. Serial No. 4,883.

*To all whom it may concern:*

Be it known that I, MARLON H. WINSLOW, a citizen of the United States, and a resident of Terre Haute, county of Vigo and State of Indiana, have invented a certain new and useful Platform-Scale; and I do hereby declare that the following is a full, clear, and exact description thereof, reference being had to the accompanying drawings, in which like letters refer to like parts.

The object of this invention is to simplify the construction of dormant platform weighing scales and increase the reliability and durability thereof. Said object is herein accomplished by mounting the platform supporting levers upon rigid stands or bearings and bringing them together at a common point for their attachment with the main beam. This prevents all vibratory movement of the platform supporting levers and other parts and, therefore, greatly prolongs the life of the bearings. Such scales are intended for use as wagon, auto-truck, stock, depot and other types of dormant scales.

The full nature of the invention will be understood from the accompanying drawings and the following description and claim.

In the drawings, Figure 1 is a plan view of a scale with the platform removed. Fig. 2 is a section on the line 2—2 of Fig. 1, omitting the levers and their connection on the near side of the main beam, for the sake of clearness. Fig. 3 is a perspective view of the bearing construction for supporting the platform, parts being broken away.

In detail there is shown herein a platform 10 and a concrete foundation 11 formed with a concrete bearing block 12. There are four of these bearing blocks, one located near each corner of the pit 13 and there is rigidly secured a bearing stand 14 upon which the outer ends of the platform supporting levers 15 are fulcrumed by suitable knife edge bearings. Between the ends of the levers 15 and near their outer ends the platform is supported by bearings 16 consisting of the knife edge 17 in the lever and the members 18, 19 and 20 with intermediate rollers 21 and 22 located between the levers 15 and a cross beam 23 secured to the underside of the platform. The free ends of the levers 15 meet together where they are operably connected with a main weighing beam 25 which is fulcrumed on a bearing 26 in a concrete bearing block 27. The weighing beam 25 is operably connected at the end 125 with means, not shown, for indicating the weight of the load.

There are two levers 15 on each side of the main beam 25 and the means for connecting one pair of said levers is illustrated in Fig. 2. There is a knife edge 30 extending through the main beam 25 and projecting beyond each side thereof. On each end of said knife edge bearing there is, as indicated by dotted lines, a bearing block 31 seated in a cross bar 32 secured to the upper end of a pair of rods 33 which extend down below the beam 25 and at their lower ends are connected by a cross bar 34 having extending centrally upward from it a vertical pivot rod 36 which is secured at its upper end to a cross plate 37 which is secured to the two rods 33 and projects beyond the same and at its ends is secured to two downwardly extending bars 38 which project below the rods 33 and at their lower ends are secured to a cross bar 39. The parts 32, 33, 34, 36, 37, 38 and 39 constitute one solid frame suspended on the knife edge 30 of the main beam. One lever 15 is fulcrumed to the vertical rod 36 in said frame and the other lever 15 is fulcrumed to a line bearing pivot 40 extending up from the center of the cross bar 39 immediately under the pin 36. Therefore, one of said levers 15 is pivotally connected with said main beam immediately under the other so that they have the same uniform action on the frame suspended from the main beam, whereby they transmit their movement to said beam. The pivotal connection of the other pair of levers 15 is the same as that shown in Fig. 2 excepting the frame is mounted on the opposite or near end of the knife edge 30.

As thus constructed it is obvious that the main beam and all of the levers 15 are mounted on stationary stands so that they have no vibratory movement horizontally, their only movement being a pivotal movement. This preserves the life of the bearings; and also the levers are connected with the main beam without any intermediate connections excepting the connecting frame, and the levers on each side of the main beam are connected therewith, one beneath the other, so as to exert their pull on the main beam in exactly the same direction. In these scales it is desirable to mount the levers 15 substantially horizontally, or so the pivoted points of the two ends thereof are in substantially the same horizontal plane.

The invention claimed is:

A weighing scale including a platform, a main beam arranged transversely of the platform, a knife edge bearing extending from opposite sides of said beam, a frame mounted on said knife edge bearing, levers for supporting the platform with their ends meeting and mounted in said frame, the levers on each side of said main beam being connected one above the other with the frame on the corresponding side of said main beam, and stationary bearing stands on which each of said levers and said main beam are fulcrumed, substantially as set forth.

In witness whereof, I have hereunto affixed my signature in the presence of the witnesses herein named.

MARLON H. WINSLOW.

Witnesses:
J. H. WELLS,
R. G. LOCKWOOD.

Copies of this patent may be obtained for five cents each, by addressing the "Commissioner of Patents, Washington, D. C."